(12) United States Patent
Matsuzawa et al.

(10) Patent No.: US 7,210,785 B2
(45) Date of Patent: May 1, 2007

(54) PROJECTOR

(75) Inventors: Kinya Matsuzawa, Shiojiri (JP); Yoshiki Fukui, Suwa (JP); Shinichi Miyazaki, Suwa (JP)

(73) Assignee: Seiko Epson Corporation (JP)

( * ) Notice: Subject to any disclaimer, the term of this patent is extended or adjusted under 35 U.S.C. 154(b) by 220 days.

(21) Appl. No.: 10/916,209

(22) Filed: Aug. 11, 2004

(65) Prior Publication Data

US 2006/0033882 A1 Feb. 16, 2006

(51) Int. Cl.
G03B 31/00 (2006.01)
G03B 21/22 (2006.01)

(52) U.S. Cl. .......................... 353/15; 353/119

(58) Field of Classification Search .............. 353/15, 353/18, 19, 119, 122; 359/443, 444; 348/480, 348/482, 484, 738, 739, 744
See application file for complete search history.

(56) References Cited

U.S. PATENT DOCUMENTS 6,643,377 B1   11/2003   Takahashi 6,807,281 B1*  10/2004   Sasaki et al. ............... 381/111
2005/0248233 A1* 11/2005  Pompei ...................... 310/322

FOREIGN PATENT DOCUMENTS

JP   11-262084     9/1999
JP   2000-028281   1/2000

OTHER PUBLICATIONS

Translation of Sasaki et al. (JP Patent No. 11-262084).*
Translation of Takahashi (JP Patent No. 2000-023281).*

* cited by examiner

Primary Examiner—W. B. Perkey
Assistant Examiner—Rochelle Blackman
(74) Attorney, Agent, or Firm—Harness, Dickey & Pierce, P.L.C.

(57) ABSTRACT

A projector including an ultrasonic speaker that includes an ultrasonic transducer capable of oscillating an acoustic signal in a wide frequency band and reproduces signal sound in the audio frequency band, and a projector main body that includes a projecting optical system that projects a video image on a projecting surface. The ultrasonic speaker and the projector main body are integrated with each other.

9 Claims, 8 Drawing Sheets

PRIOR ART

PROJECTOR

FIELD OF THE INVENTION

The present invention relates to a projector having an ultrasonic speaker including an ultrasonic transducer that generates prescribed high sound pressure over a wide frequency band.

BACKGROUND OF THE INVENTION

A conventional projector is mainly used for presentations at, for example, a conference, and therefore there is little need for the projector main body to have a speaker. This is because the presenter usually explains the data projected on a screen using a microphone. As such, the speech is audible as audio information in a conference hall or the like through speakers.

However, as DVD system use spreads in the future, users will probably prefer larger screens. When a projector is used as a large screen image device, an acoustic system is necessary. In certain use environments, however, there is hardly space to provide a stereo surround system or a 5.1 channel surround system. Further, such a sound system is costly. As such, the value of a projector as a tool for providing a home theater or for showing educational materials is almost nonexistent.

A speaker that allows the projector to be used as if it is a radio-cassette player could be installed in the projector main body. A general loudspeaker, however, is insufficient in volume and cannot provide enough acoustic sound if installed in the projector. That is, if a speaker is provided in the projector main body and sound is generated from it, the positional difference between the sound source and the screen that actually shows images inevitably makes the viewers feel that the sound and the action on the screen are not exactly synchronized.

Figure 8:
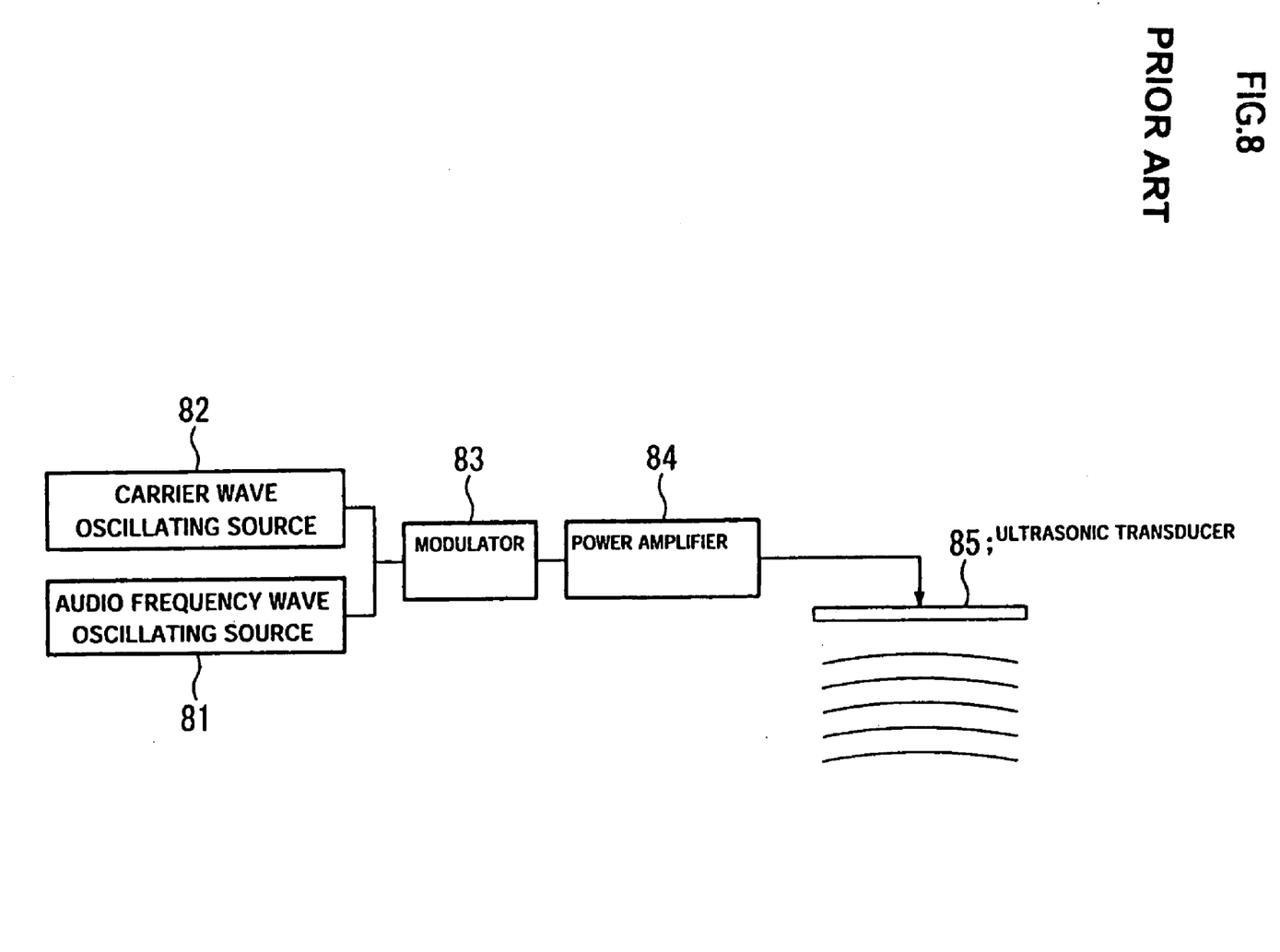
FIG. 8 is a block diagram of the electrical configuration of a conventional ultrasonic speaker.

The idea of storing an ultrasonic speaker using an ultrasonic transducer in a projector has been suggested. Such a conventional ultrasonic speaker is shown in FIG. 8. The ultrasonic speaker includes an audio frequency wave oscillating source 81 that generates a signal in the audio frequency band, a carrier wave oscillating source 82 that generates a carrier wave, a modulator 83, a power amplifier 84, and an ultrasonic transducer 85.

In the above conventional ultrasonic speaker, a carrier wave in the ultrasonic frequency band output from the carrier wave oscillating source 82 is modulated, with a signal output from the audio frequency wave oscillating source 81 by the modulator 83. The modulated signal amplified by the power amplifier 84 drives the ultrasonic transducer 85. In this manner, the modulated signal is converted into a sound wave in a finite amplitude level by the ultrasonic transducer 85, and the sound wave is radiated into a medium (air), so that the non-linear effect of the medium (air) allows signal sound in the original audio frequency band to be reproduced.

In this case, the range of reproducing the signal in the audio frequency band corresponds to a beam-shaped range in the direction of the radiation axis from the ultrasonic transducer 85.

Figure 9:
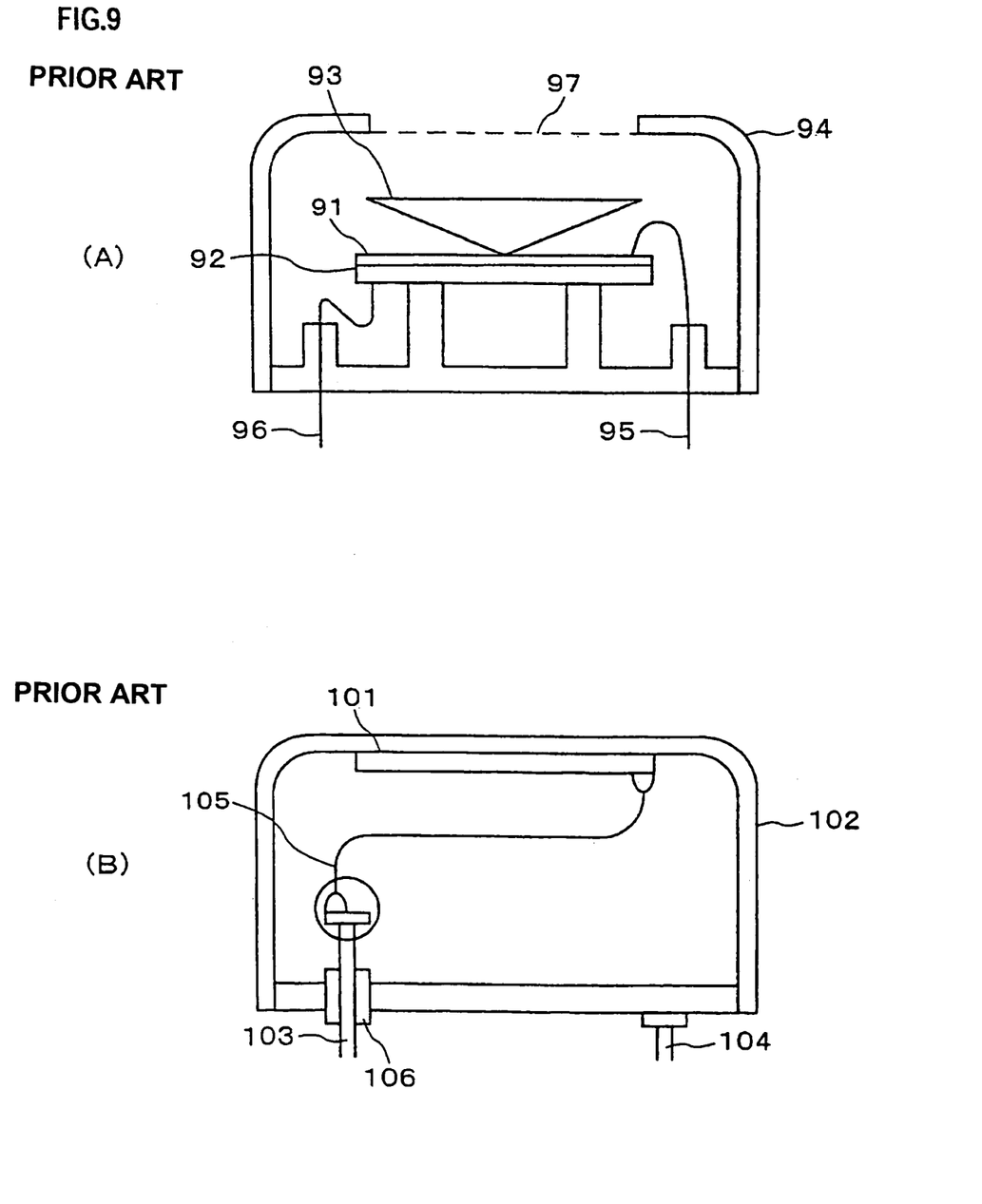
FIG. 9 is a view of a resonant type ultrasonic transducer.

The construction of such a conventional ultrasonic transducer used in an ultrasonic speaker is shown in FIG. 9. The conventional ultrasonic transducer is mostly a resonant type, using piezoelectric ceramic as an oscillating element. The ultrasonic transducer shown in FIG. 9 uses piezoelectric ceramic as the oscillating element to convert an electric signal into an ultrasonic wave and vice versa (transmits/receives an ultrasonic wave). The bimorph ultrasonic transducer shown in FIG. 9(A) includes two pieces of piezoelectric ceramic 91 and 92, a cone 93, a case 94, leads 95 and 96, and a screen 97.

The pieces of piezoelectric ceramic 91 and 92 are joined with each other and the leads 95 and 96 are connected to the surfaces opposing the joining surface.

A unimorph ultrasonic transducer, shown in FIG. 9(B), includes a piece of piezoelectric ceramic 101, a case 102, leads 103 and 104, an internal interconnection 105, and a glass part 106. The piece of piezoelectric ceramic 101 is connected with the lead 103 through the internal interconnection 105 and grounded to the case 102.

The resonant ultrasonic transducer takes advantage of the resonance of the piezoelectric ceramic, and therefore the transmitting/receiving characteristics for the ultrasonic waves are good only in several relatively narrow frequency bands around the resonance frequency. Therefore, the quality of the generated sound is not high.

SUMMARY OF THE INVENTION

The present invention is directed to a solution to the above described disadvantages, and it is an object of the invention to provide a projector that can easily be carried and provide the acoustics that could be only possible with a stereo surround system or a 5.1 channel surround system according to the conventional technique without such a large scale audio system.

In order to achieve the above described object of the invention, a projector according to the invention includes an ultrasonic speaker having an ultrasonic transducer that is capable of oscillating an acoustic signal in a wide frequency band, and capable of reproducing signal sound in the audio frequency band. A projector main body having a projecting optical system that projects a video image on a projecting surface is also included. The ultrasonic speaker and the projector main body are preferably integrated with each other.

A projector according to another aspect of the invention includes a signal source that generates a signal wave in the audio frequency band, a carrier wave supply means that generates a carrier wave in the ultrasonic frequency band for output, modulating means that modulates the carrier wave with the signal wave, and an ultrasonic transducer that is capable of oscillating an acoustic signal in a wide frequency band and driven by the modulated signal output from the modulating means to convert the modulated signal into a sound wave in a finite amplitude level for radiation into a medium. An ultrasonic speaker outputs signal sound in the audio frequency band as a reproduced signal, and a projector main body has video image producing means that produces a video image and a projecting optical system that projects the video image produced by the video image producing means on a projecting surface. The ultrasonic speaker and the projector main body are preferably integrated with each other.

According to another aspect of the invention, the sound wave radiation surface of the ultrasonic transducer has a flat shape.

According to yet another aspect of the invention, the optical axis of a projector lens that forms a projecting optical system provided in the projector main body and projects a video image on the projecting surface that matches the normal direction to the sound wave radiation surface of the ultrasonic transducer.

The ultrasonic transducer is preferably fixed to the projector main body in a location in the front where the whole or part of the projector main body does not obstruct sound wave radiation.

Also, the ultrasonic transducer is stored in the projector main body when the projector is not used and taken out from the projector main body when the projector is used.

According to the invention, one the ultrasonic speaker including the ultrasonic transducer is provided and functions as a monaural sound source.

According to the invention, a plurality of the ultrasonic speakers including the ultrasonic transducers are provided, and in at least one of the plurality of ultrasonic transducers forming the ultrasonic speakers, the normal direction to the sound wave radiation surface of the ultrasonic transducer matches the optical axis of the projector lens.

According to the invention ,the ultrasonic transducer is an electrostatic transducer capable of oscillating an acoustic signal in a wide frequency band.

According to the invention, the ultrasonic speaker has a reproducing range control processing portion capable of controlling an audible reproducing range by controlling the frequency of the carrier wave.

The projector can have its video size changed based on the positional relation to the screen, which is an advantage that other types of large size displays do not provide. The projector is, therefore, optimum for use at home where the size and shape of the viewing area and the furniture arrangement vary. The projector main body-integrated ultrasonic speaker according to the invention can easily be carried to any room in the house as if it is a radio cassette recorder, and the user can enjoy a large size image projected on a dedicated screen or wall together with matched sound. The projector can be much more useful at a school, where the acoustic environment is not exactly satisfactory.

In the projector according to the invention, the ultrasonic transducer forming the ultrasonic speaker can oscillate an acoustic signal in a wide frequency band (a sound wave in the ultrasonic frequency band), so that the frequency of the carrier wave is changed to control the spatial range of reproducing the signal in the audio frequency band. In this way, the projector can easily be carried and provide the acoustics that could be only possible with a stereo surround system or a 5.1 channel surround system according to the conventional technique without such a large scale audio system.

DETAILED DESCRIPTION OF PREFERRED EMBODIMENTS

Figure 1:
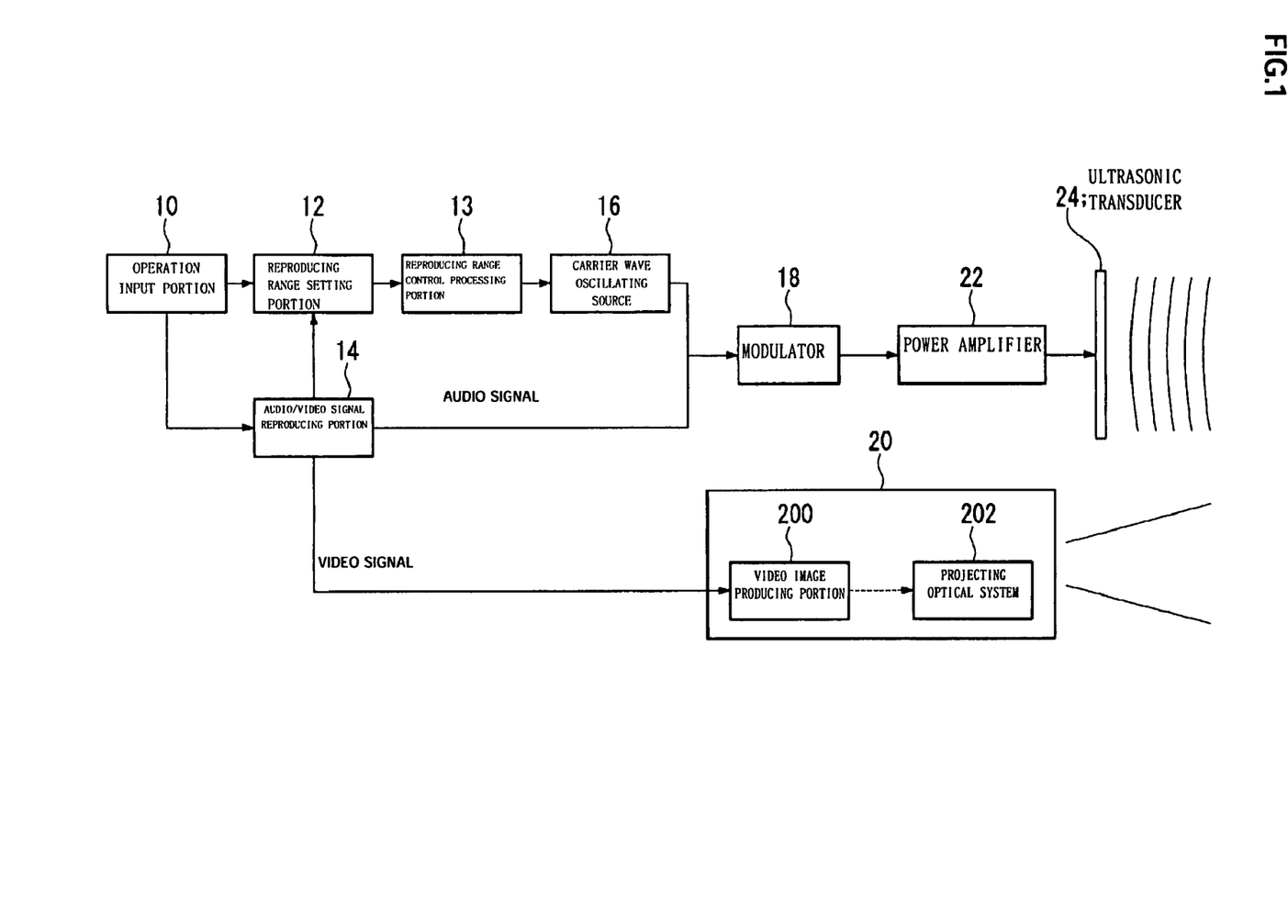
FIG. 1 is a block diagram of the electrical configuration of a projector according to an embodiment of the invention.

Now, an embodiment of the invention will be described in detail in conjunction with the accompanying drawings. FIG. 1 shows the electrical configuration of a projector according to the embodiment. The projector 1 includes an ultrasonic speaker made of an operation input portion 10, a reproducing range setting portion 12, an audio/video signal reproducing portion 14, a carrier wave oscillating source 16, a modulator 18, a power amplifier 22, an ultrasonic transducer 24, and a projector main body 20.

The projector main body 20 has a video image producing portion 200 that produces a video image, and a projecting optical system 202 that projects the produced image onto a projection surface.

The projector 1 according to the embodiment preferably has the ultrasonic speaker and the projector main body 20 integrated with each other.

The operation input portion 10 has various function keys including a ten-key, a numeric key, and a power supply key to turn on/off the power supply.

The user operates the keys of the operation input portion 12 and inputs data to specify a range of a reproducing signal (signal sound) to be reproduced. When the data is input, the frequency of the carrier wave to define the reproducing range of the reproducing signal is set and held. The reproducing range of the reproducing signal is set by specifying the distance the reproducing signal travels from the sound wave radiation surface of the ultrasonic transducer 22 along the radiation axis.

The reproducing range setting portion 12 can set the frequency of the carrier wave based on a control signal output in response to the content of an image by the audio/video signal reproducing portion 14.

The reproducing range control processing portion 13 can refer to the content set by the reproducing range setting portion 12 and control the carrier wave oscillating source 16 to change the frequency of the carrier wave generated by the carrier wave oscillating source 16 to correspond to the set reproducing range.

For example, when the above described distance is set for a carrier frequency of 50 kHz as the internal information in the reproducing range setting portion 12, the carrier wave oscillating source 12 is controlled to oscillate at 50 kHz.

The reproducing range control processing portion 13 has a storing portion that stores a table including the relation between the distance along the radiation axis that the reproducing signal travels from the ultrasonic radiation surface of the ultrasonic transducer 22, i.e., the distance defining the reproducing range, and the frequency of the carrier wave. The data in the table can be obtained by actually measuring the relation between the frequency of the carrier wave and the distance the reproducing signal travels.

The reproducing range control processing portion 13 obtains the frequency of the carrier wave corresponding to the distance information set by referring to the table based on the content set by the reproducing range setting portion 12, and controls the carrier wave oscillating source 16 to oscillate at the frequency.

The audio/video signal reproducing portion 14 is, for example, a DVD player that uses a DVD as an image medium, and the reproduced audio signal is output to the modulator 18 and the video signal is output to the video image producing portion 200 in the projector main body 20.

Note that according to the embodiment, the audio/video signal reproducing portion 14 is a DVD player, but the portion 14 is not limited to it and may be a reproducing device that reproduces an externally input video signal.

The audio/video signal reproducing portion 14 can output a control signal to notify a reproducing range to the reproducing range setting portion 12 so that the range of reproducing the sound can be dynamically changed to make the acoustics match scenes by reproduced images.

The carrier wave oscillating source 16 can generate a carrier wave at a frequency in the ultrasonic frequency band specified by the reproducing range setting portion 12 and output the carrier wave to the modulator 18.

The modulator 18 can AM-modulate the carrier wave supplied from the carrier wave oscillating source 16 with an audio signal in the audio frequency band output from the audio/video signal reproducing portion 14 and output the modulated signal to the power amplifier 22.

The ultrasonic transducer 24 can be driven by the modulated signal output from the modulator 18 through the power amplifier 22, convert the modulated signal into a sound wave in a finite amplitude level for radiation into the medium and reproduce signal sound (a reproducing signal) in the audio frequency band. The ultrasonic transducer 24 is, for example, an electrostatic type transducer capable of oscillating an acoustic signal in a wide frequency band (ultrasonic wave). The ultrasonic transducer 24 may be of any type other than the electrostatic type as long as it can oscillate an acoustic signal in a wide frequency band.

The video image producing portion 200 includes a display such as a liquid crystal display and a plasma display panel (PDP), and a driving circuit that drives the display based on a video signal output from the audio/video signal reproducing portion 14. The video image producing portion 200 produces a video image obtained from the video signal output from the audio/video signal reproducing portion 14.

The projecting optical system 202 can project a video image displayed on the display at the projecting surface such as a screen provided in front of the projector main body 20.

Figure 2:
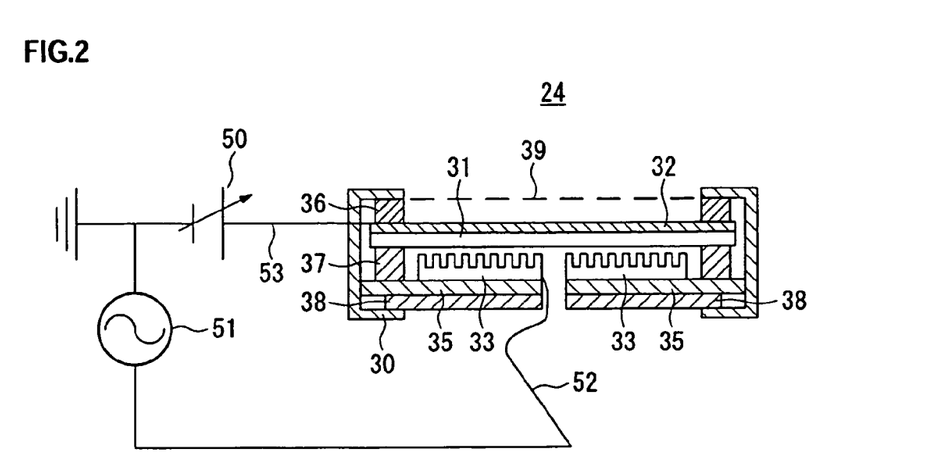
FIG. 2 is a diagram showing the specific configuration of the ultrasonic transducer in FIG. 1.

The specific construction of the ultrasonic transducer 24 is shown in FIG. 2. The electrostatic type ultrasonic transducer shown in FIG. 2 includes a dielectric 31 (insulator) such as PET (polyethyleneterephthalate resin) with a thickness of about an oscillator. A preferred thickness of the dielectric 31 is in the range of 3 üm to 10 μm. An upper electrode 32, such as an aluminum electrode is integrally formed on the upper surface part of the dielectric 31 by vapor deposition or the like. A lower electrode 33, which may be made of a material such as brass, is provided in contact with the lower surface part of the dielectric 31. The lower electrode 33 is connected with a lead 52 and is fixed to a base plate 35 made of, for example, Bakelite.

The upper electrode 32 is connected with another lead 53 that is connected to a DC bias power supply 50. The DC bias power supply 50 constantly supplies the upper electrode 32 with a DC bias voltage in the range of about 50V to 150V for attracting the upper electrode 32 so that the upper electrode 32 is attached to a side of lower electrode 33. An AC signal source 51 corresponds to the output (50V AC to 150V AC p—p) of the power amplifier in FIG. 1.

The dielectric 31 and the upper electrode 32, as well as the base board 35, are caulked together with metal rings 36, 37, and 38 and mesh 39 by the case 30.

Figure 3:
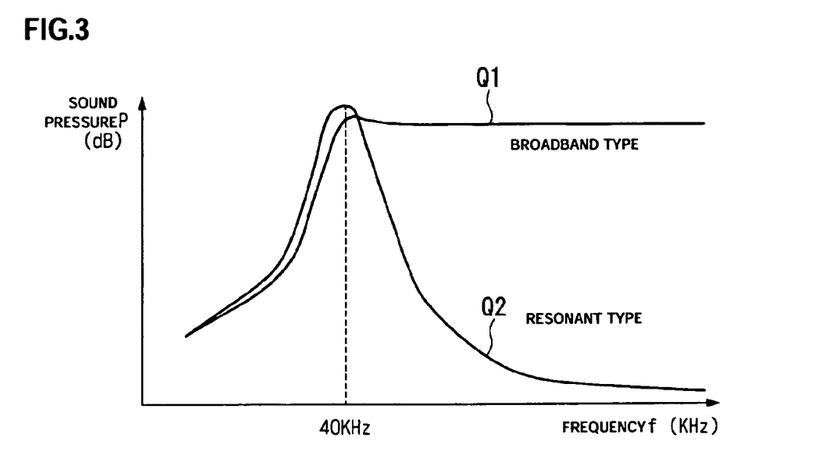
FIG. 3 is a chart showing the frequency characteristic of the ultrasonic transducer shown in FIG. 2.

A plurality of small grooves about as large as several tens to several hundreds of μm in unequal shapes are formed on the surface of the lower electrode 33 on a side of the dielectric 31. The small grooves correspond to the gaps between the lower electrode 33 and the dielectric 31, and therefore the distribution of the electrostatic capacitance between the upper electrode 32 and the lower electrode 33 slightly fluctuates. The random small grooves are formed by roughing the surface of the lower electrode 33. In the electrostatic ultrasonic transducer, numerous capacitances whose gaps have different sizes or depths are formed so that the frequency characteristic of the ultrasonic transducer corresponds to a wide frequency band as indicated by the curve Q1 in FIG. 3.

In the ultrasonic transducer 24 described above, a modulated signal (output from the power amplifier 22) is applied between the upper electrode 31 and the lower electrode 33 while a DC bias voltage is applied to the upper electrode 32. In the frequency characteristic of the resonant ultrasonic transducer indicated by the curve Q2 in FIG. 3, the center frequency (resonance frequency of the piezoelectric ceramic) is, for example, 40 kHz at which the maximum sound pressure is provided. At frequencies ±5 kHz from the center frequency, the sound pressure is 30 dB less than the maximum sound pressure. A curve representing the frequency characteristic of a wide frequency band oscillating ultrasonic transducer is flat from 40 kHz to about 100 kHz, and at 100 kHz, the sound pressure is about the maximum sound pressure ±6 dB.

Now, the operation of the projector 1 according to the embodiment having the above described construction will be described. Data (distance information) indicating a reproducing range of a reproducing signal is set in the reproducing range setting portion 12 from the operation input portion 10 by the user's key operation, and a reproducing instruction is given to the audio/video signal reproducing portion 14. Consequently, the distance information to define the reproducing range is set in the reproducing range setting portion 12. The reproducing range control processing portion 13 obtains the distance information set in the reproducing range setting portion 12, produces the frequency of a carrier wave corresponding to the thus set distance information by referring to a table stored in the storing portion provided inside, and controls the carrier wave oscillating source 16 to generate a carrier wave at the frequency. In this way, the carrier wave oscillating source 16 generates the carrier wave at the frequency corresponding to the distance information set in the reproducing range setting portion 12, and outputs the carrier wave to the modulator 18.

Meanwhile, the audio/video signal reproducing portion 14 outputs an audio signal to the modulator 18 and a video signal to the video image producing portion 200 in the projector main body 20.

The video signal producing portion 200 drives the display based on the input video signal and produces a video image for display. The image displayed at the display is projected on a projection surface such as a screen by the projecting optical system 20.

Meanwhile, the modulator 18 AM-modulates the carrier wave output from the carrier wave oscillating source 16 with an audio signal output from the audio/video signal reproducing portion 14, and outputs the resulting signal to the power amplifier 22.

The modulated signal amplified by the power amplifier 22 is applied between the upper electrode 32 and the lower electrode 33 of the ultrasonic transducer 24, and the modulated signal is converted into a sound wave (acoustic signal) in a finite amplitude level and radiated into the medium (air).

Now, the non-linear effect of the medium (air) will briefly be described. In the process of propagation of the ultrasonic wave radiated into the medium (air) by the ultrasonic transducer, the acoustic velocity is higher for the part at high sound pressure and lower for the part at low sound pressure. It is known that this causes waveform distortion.

It is also known that when the signal in the ultrasonic band (carrier wave) to be radiated is modulated (AM-modulated) with a signal in the audio frequency band, the above described waveform distortion causes the signal wave in the audio frequency band used for modulation to be separated from the carrier wave in the ultrasonic frequency band and self-demodulated. At the time, the reproduced signal spreads in a beam shape because of its characteristic as an ultrasonic sound, and the sound is reproduced only in a particular direction totally different from usual speakers.

In the projector according to the embodiment, the beam shaped reproduced signal output from the ultrasonic transducer 24 that forms the ultrasonic speaker is radiated toward the projecting surface (screen) on which the image is projected by the projecting optical system 202 and reflected by the projecting surface to diffuse. The radiation range varies because the distance between the sound wave radiation surface of the ultrasonic transducer 24 and the separation location of the reproduced signal from the carrier wave in the direction of its radiation axis (in the normal direction) and the beam width (beam spread angle) of the carrier wave are different based on the frequency of the carrier wave set in the reproducing range setting portion 12.

Figure 4:
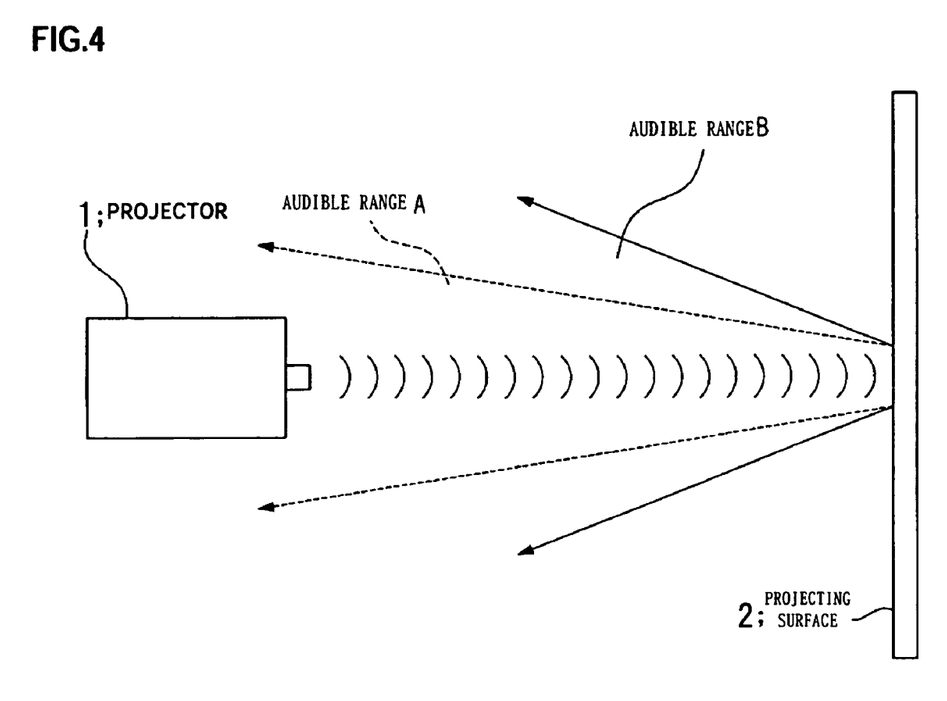
FIG. 4 is a view showing a concept of the state in which a signal is reproduced by an ultrasonic transducer provided in a projector according to the embodiment.

FIG. 4 shows the state of how the signal is reproduced by the ultrasonic speaker including the ultrasonic transducer 24 in the projector according to the embodiment. In the projector 1, when the ultrasonic transducer is driven by a modulated signal which is produced by modulating the carrier wave with the audio signal, and the carrier frequency set by the reproducing range setting portion 12 is low, the distance between the sound wave radiation surface of the ultrasonic transducer 24 and the separation location of the reproduced signal from the carrier wave in the direction of its radiation axis (in the normal direction to the sound wave radiation surface) or the distance to the reproducing location is long.

In this way, the beam of the reproduced signal in the audio frequency band reaches the projecting surface 2 with relatively little spreading and is reflected by the projecting surface 2 in the state, and therefore the reproducing range corresponds to the audible range A denoted by the dotted line arrow in FIG. 4. Therefore, the reproduced signal (reproduced sound) is audible over a relatively far and narrow range from the projecting surface 2.

In contrast, when the carrier frequency set by the reproducing range setting portion 12 is higher than the above, the sound wave radiated from the sound wave radiation surface of the ultrasonic transducer 24 is more limited than the case for the low frequency. But the distance between the sound wave radiation surface of the ultrasonic transducer 24 and the separation location of the reproduced signal from the carrier wave in the direction of its radiation axis (in the normal direction to the sound wave radiation surface) or the distance to the reproducing location is short.

Therefore, the beam of the reproduced signal in the audio frequency band spreads before reaching the projecting surface 2, and is reflected by the projecting surface 2 in the state, so that the reproducing range corresponds to the audible range B denoted by the solid line arrow in FIG. 4.

Therefore, the reproduced signal (reproduced sound) is audible over a relatively near and wide range from the projecting surface 2.

Now, an example of how to provide the ultrasonic speaker in the projector according to the embodiment will be described with reference to FIGS. 5 to 7.

Figure 5A:
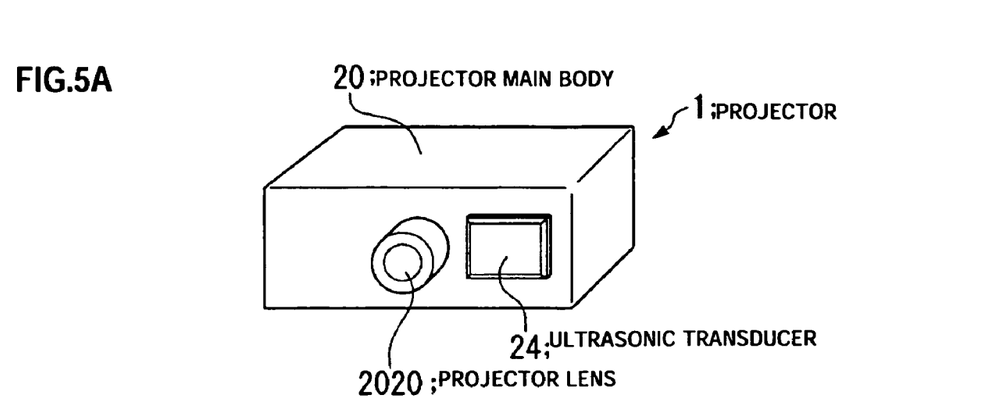
FIG. 5 is an overview of the arrangement in which only a single ultrasonic transducer is provided in the projector according to the embodiment.
Figure 5B:
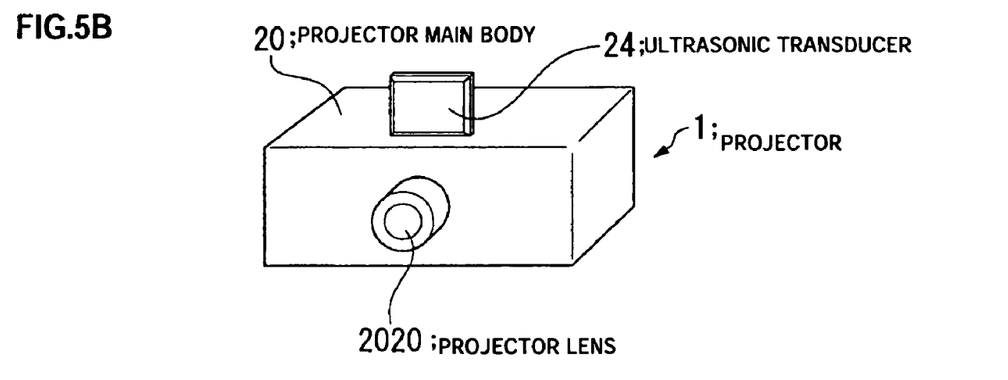
Figure 6A:
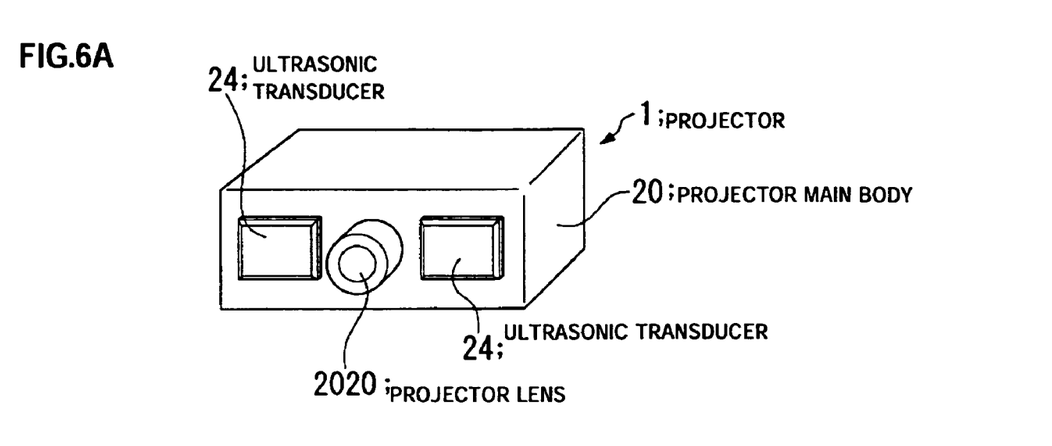
FIG. 6 is an overview of the arrangement in which two ultrasonic transducers are provided in the projector according to the embodiment.
Figure 6B:
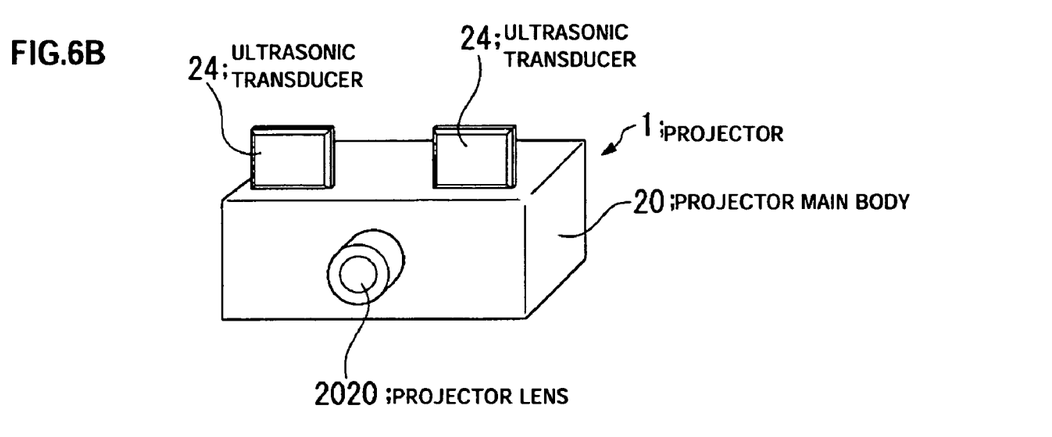

In the example in FIG. 5, a single ultrasonic transducer forms the ultrasonic speaker. In this example, the speaker functions as a monaural sound source. Here, in FIGS. 5(a) and 5(b), the ultrasonic transducer 24 has a flat shaped sound wave radiation surface. The optical axis of the projector lens 2020 that is part of the projecting optical system 202 provided in the projector main body 20 and projects a video image on a projecting surface matches the normal direction to the sound wave radiation surface of the ultrasonic transducer 24.

In the example in FIG. 5(a), the ultrasonic transducer 24 is provided on the right of the projector lens 2020 when viewed from the front, but it may be provided on the left. In this way of arrangement, the front side of the projector main body 20 is formed flat and therefore the direction of the optical axis of the projector lens 2020 (i.e., the screen direction and the normal direction) to the sound wave radiation surface of the ultrasonic transducer 24 are easily matched.

The ultrasonic transducer 24 is provided on the upper side of the projector lens 2020 in FIG. 5(b), and the position may be in the middle, or on the right or left as long as the transducer is located on the upper surface of the projector main body 20. It is imperative that the direction of the optical axis of the projector lens 2020 and the normal direction to the sound wave radiation surface of the ultrasonic transducer 24 are matched.

FIG. 6 shows an example of how to provide two ultrasonic speakers, i.e., two ultrasonic transducers 24.

The use of the two speakers allows the acoustics of a stereo system to be obtained. In the example shown in FIG. 6(a), the speakers are provided on the right and left of the projector lens 2020. In the example shown in FIG. 6(b), the transducers are provided in symmetrical positions on the right and left on the upper surface of the projector main body 20. It should be understood, however, that when two ultrasonic transducers 24 are provided, one of them may be provided beside the projector lens 2020 and the other may be provided on the upper surface of the projector lens 2020, instead of the above described arrangement.

FIG. 7 shows an example of how to provide at least three ultrasonic speakers (i.e., at least three ultrasonic transducers 24 are provided).

Figure 7A:
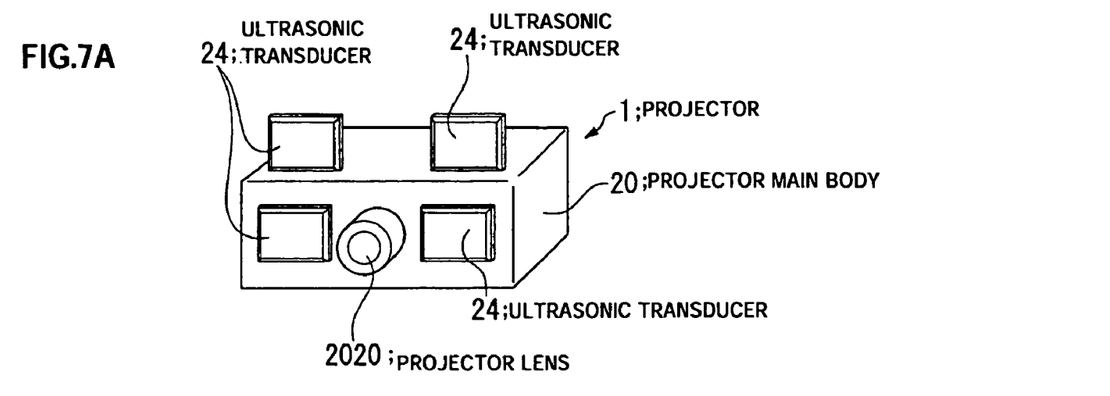
FIG. 7 is an overview of the arrangement in which at least three ultrasonic transducers are provided in the projector according to the embodiment.

In the example shown in FIG. 7(a), four ultrasonic transducers 24 are provided. Two of the transducers are provided on the right and left of the projector lens 2020, and the other two are provided on the right and left on the top surface of the projector main body 20. Not all the ultrasonic transducers have to face the screen. Some of the ultrasonic transducers 24 may use sound reflected from various positions.

Figure 7B:
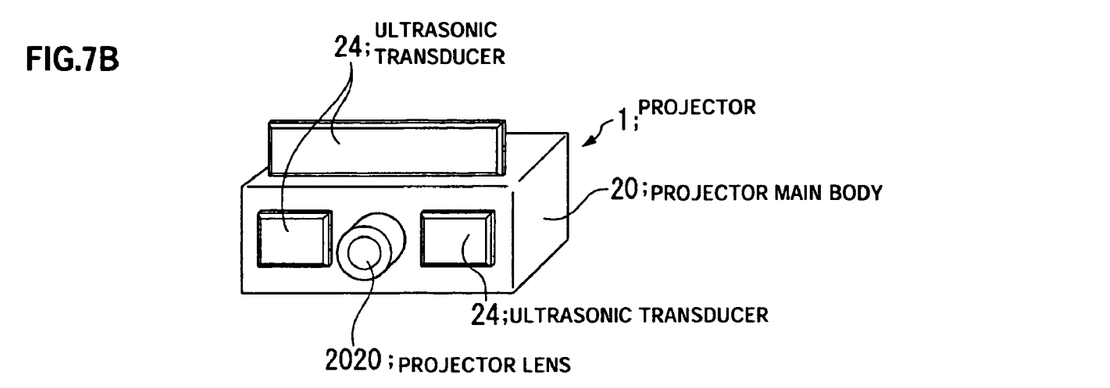

In the example in FIG. 7(b), three ultrasonic transducers 24 are provided. Similarly to the example in FIG. 7(a), not all the ultrasonic transducers have to face the screen. The acoustics equal to a stereo sound speaker plus a very low audio frequency speaker may be provided. More specifically, the ultrasonic transducers 24 corresponding to the stereo sound speaker may be provided on the right and left of the projector lens 2020, and the other ultrasonic transducers 24 corresponding to the very low audio frequency speaker may be provided on the side surface of the projector main body 20, so that the acoustics may be provided.

Figure 7C:
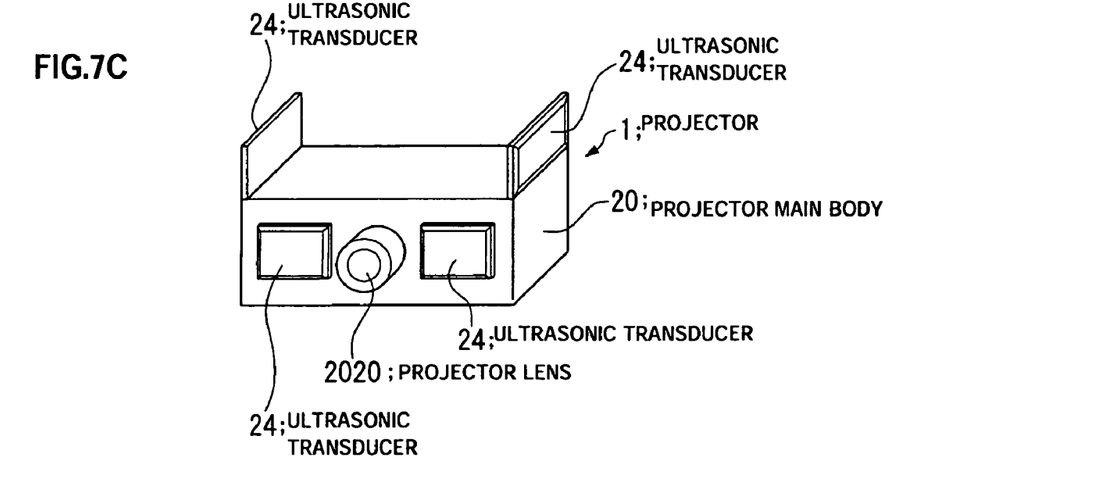

As can be seen from FIG. 7(c), two ultrasonic transducers 24 provided on the top surface of the projector main body 20 face sideways. The ultrasonic transducers 24 that form the ultrasonic speakers have high directivity and, therefore, signal sound radiated sideways of the projector main body 20 is reflected and audible from the sides of the projector main body 20. Similarly, signal sound may be radiated backward or upward from the projector main body 20. Note that when two or more ultrasonic transducers 24 are provided at the projector main body 20, at least one of the ultrasonic transducers 24 is provided so that the normal direction to the sound wave radiation surface of the ultrasonic transducer 24 matches the optical axis of the projector lens 2020.

In this way, the use of the plurality of ultrasonic transducers 24 can create an acoustic environment as good as using a conventional 5.1 channel surround system.

Note that the ultrasonic transducers 24 shown in FIGS. 5 to 7 are all fixed, but the ultrasonic transducers 24 may be storable (i.e., they may be stored in the projector main body 20 when they are not used and taken out from the projector main body 20 when they are used).

The invention claimed is:

1. A projector comprising:
    an ultrasonic speaker that reproduces signal sound in an audio frequency band, said speaker having an ultrasonic transducer capable of oscillating an acoustic signal; and
    a projector main body having a projecting optical system that projects a video image on a projecting surface,
    wherein said ultrasonic speaker and said projector main body are integrated with each other, and
    said ultrasonic transducer is storable in said projector main body and removable from said projector main body.

2. A projector comprising:
    a signal source that generates a signal wave in an audio frequency band;
    carrier wave supply means for generating a carrier wave in an ultrasonic frequency band for output;
    modulating means for modulating said carrier wave with said signal wave;
    an ultrasonic transducer capable of oscillating an acoustic signal, the ultrasonic transducer driven by a modulated signal output from the modulating means for converting the modulated signal into a sound wave in a finite amplitude level for radiation into a medium;
    an ultrasonic speaker that outputs signal sound in the audio frequency band as a reproduced signal; and
    a projector main body having video image producing means for producing a video image and a projecting optical system that projects the video image produced by the video image producing means on a projecting surface;
    wherein said ultrasonic speaker and said projector main body are integrated with each other, and
    said ultrasonic transducer is storable in said projector main body and removable from said projector main body.

3. The projector according to claim 1, wherein the sound wave radiation surface of said ultrasonic transducer has a flat shape.

4. The projector according to claim 3, wherein an optical axis of a projector lens that forms the projecting optical system provided in said projector main body and projects a video image on the projecting surface matches the normal direction to the sound wave radiation surface of said ultrasonic transducer.

5. The projector according to claim 1, wherein said ultrasonic transducer is fixed to a front surface of said projector main body in a location where a whole or a part of said projector main body does not obstruct sound wave radiation.

6. The projector according to claim 1, wherein said ultrasonic speaker including said ultrasonic transducer functions as a monaural sound source.

7. The projector according to claim 1, further comprising:
    a plurality of said ultrasonic speakers including said ultrasonic transducers;
    wherein, in at least one of the plurality of ultrasonic transducers forming said ultrasonic speakers, a normal direction to the sound wave radiation surface of the ultrasonic transducer matches the optical axis of said projector lens.

8. The projector according to claim 1, wherein said ultrasonic transducer is an electrostatic transducer capable of oscillating an acoustic signal in a wide frequency band.

9. The projector according to claim 1, wherein said ultrasonic speaker has a reproducing range control processing portion capable of controlling an audible reproducing range by controlling the frequency of said carrier wave.

* * * * *